United States Patent
Ruettinger

[15] 3,692,163
[45] Sept. 19, 1972

[54] TRANSMISSION
[72] Inventor: Thurman O. Ruettinger, R.D. 1 West Lake Rd., Skaneateles, N.Y. 13152
[22] Filed: June 1, 1971
[21] Appl. No.: 148,772

[52] U.S. Cl. .................................192/53 F, 74/333
[51] Int. Cl. ..............................................F16d 23/02
[58] Field of Search ..................192/53 A, 53 E, 53 F

[56] References Cited

UNITED STATES PATENTS 2,667,955   2/1954   Bixby.......................192/53 A
3,419,120   12/1968  Stott........................192/53 F Primary Examiner—Allan D. Herrmann
Attorney—Talburtt & Baldwin

[57] ABSTRACT

Manual transmission having clutching and synchronizing assemblies using elongated spring means biasing energizing pins radially outwardly.

10 Claims, 3 Drawing Figures

INVENTOR.
Thurman O. Ruettinger

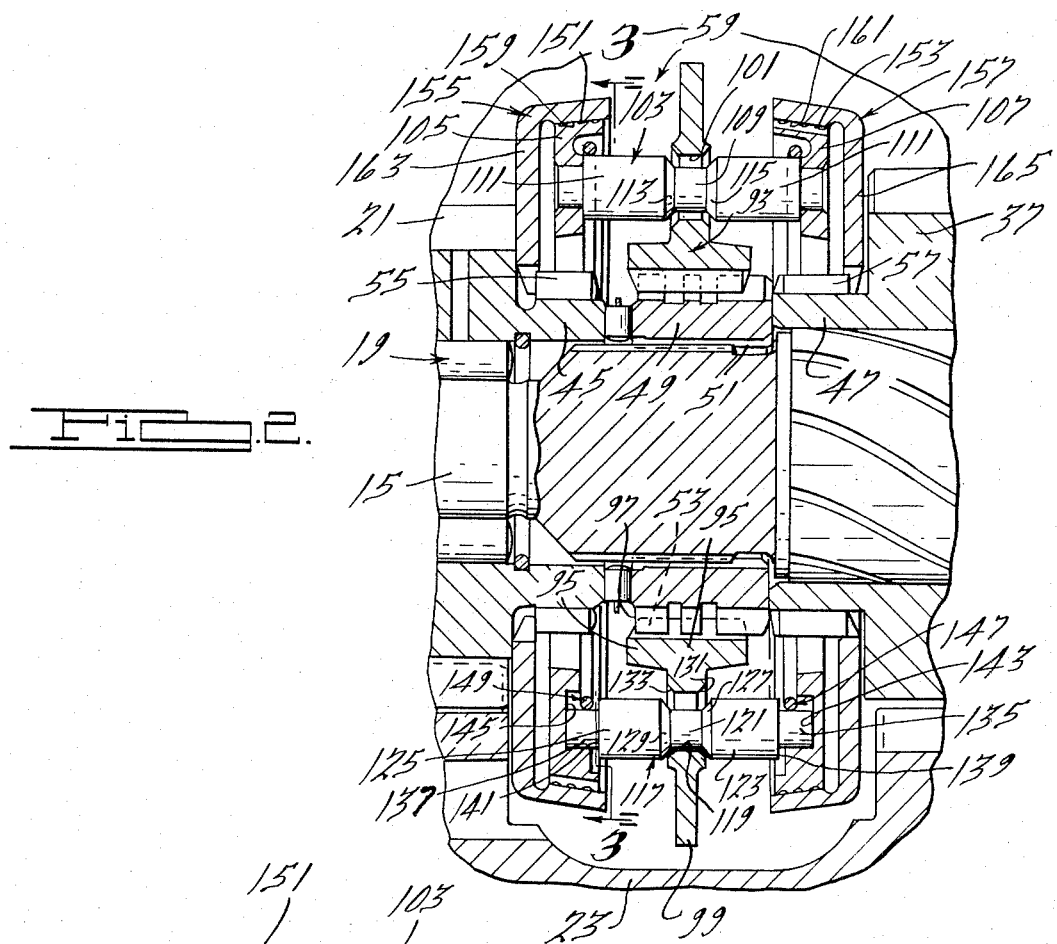
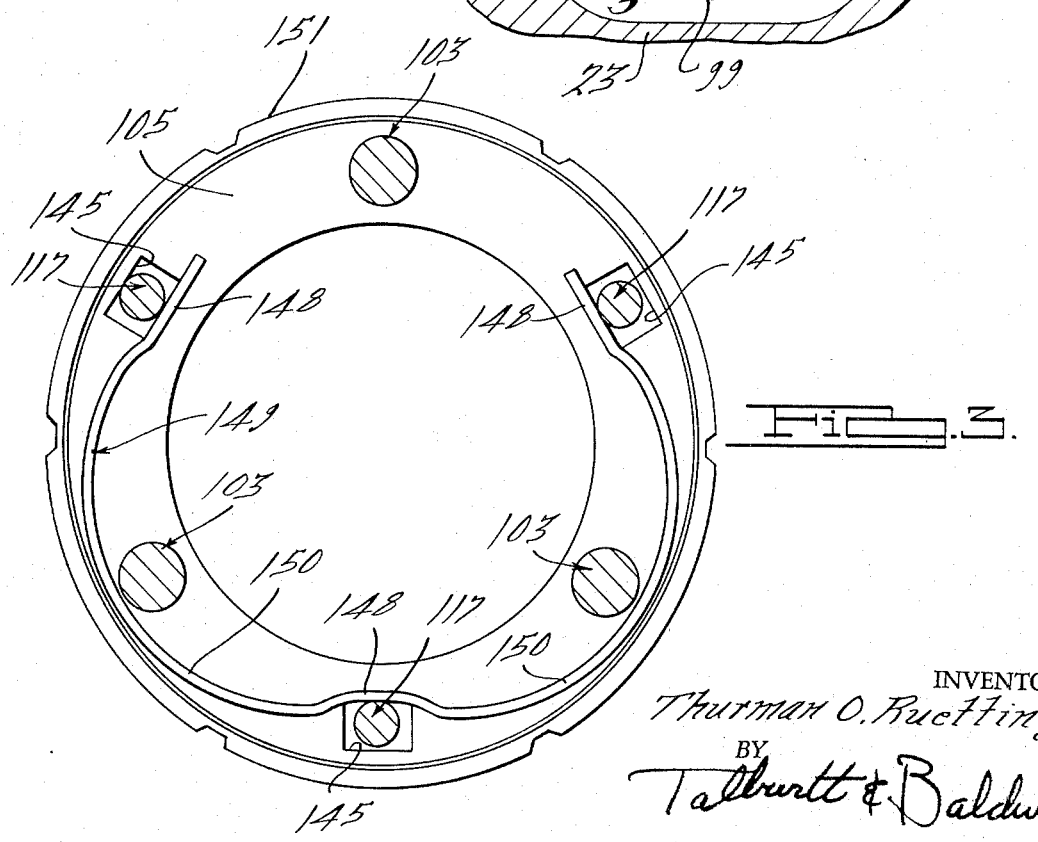

TRANSMISSION

BACKGROUND OF THE INVENTION

This invention relates to transmissions, and more particularly, to synchronizer assemblies for power transmission apparatus.

More specifically, synchronizer assemblies are used in gear type power transmission mechanisms having gears in constant mesh. Ratio changes are accomplished by clutching a gear to the shaft upon which it is mounted. This is often done by a jaw type or other positive clutch. To connect the gear to the shaft it is necessary to accelerate the gear if it originally is not rotating, or to change the speed of such gear if it is already rotating, to equal the speed of the shaft so that the positive clutch can be engaged without clashing or mismatch of clutch teeth prior to and during engagement. A synchronizer assembly having an auxiliary friction clutch is often employed. Such friction clutch first engages the gear and accelerates or changes the speed thereof until it is synchronized with the shaft speed. When the speeds of the shaft and gear are synchronized the positive clutch can be engaged without clashing.

One type of synchronizer assembly is shown in U. S. Pat. No. 2,667,955 to Bixby. Such synchronizer includes an axially slideable clutch hub mounted on a splined portion of a main shaft on which two axially spaced gears are rotatably mounted. The clutch hub has jaw clutch teeth which are adapted to be disposed in engagement with jaw clutch teeth located on the rotatable gears. The clutch hub is formed with a radially extending clutch ring. This ring has several openings spaced circumferentially therearound. A plurality of pins connected at their ends to synchronizer rings extend through some of the openings. The synchronizer rings have friction surfaces which are adapted to frictionally engage friction surfaces on the gears. The pins have shoulders adjacent a central portion which cooperate with edges of the openings in the clutch ring for preventing axial movement of the ring relative to the synchronizer rings when they are rotating synchronously. Split pin assemblies extend through the other openings and have their ends received in the synchronizer rings. The split pin assemblies have central annular grooves and are biased into engagement with the periphery of the openings by resilient means located between portions of each split pin assembly. During initial movement of the clutch ring the synchronizer rings move conjointly therewith because of the influence of the split pin assemblies. After one of the synchronizer rings is placed in clutching engagement with the friction surface of the adjacent gear and the synchronous speed is obtained between the gear and the clutch hub, further axial movement of the hub will cause portions of the split pin assemblies to collapse to permit rapid engagement of the clutch teeth of the gear and hub. There are many other types of synchronizing assemblies, but the above described type is well-known.

The present invention is adapted to perform the same function as the apparatus described above. However, this synchronizer is of a different and improved construction and eliminates certain difficulties encountered with the above-noted synchronizer.

BRIEF SUMMARY OF THE INVENTION

Briefly, this invention comprises a manual transmission having a synchronizer utilizing energizing means biased in a manner to facilitate synchronizing of a clutch hub and gear.

One of the primary objects of this invention is to provide a manual transmission having multiple speed ratios with synchronizing assemblies which are adapted to effectively synchronize the speeds of a gear and a shaft to which the gear is to be coupled.

Another object of this invention is to provide apparatus of the class described in which the energizing forces are increased when the rotational speeds are increased.

A further object of this invention is to provide a device of the class described in which floating pins are loaded by spring means independent of the clutch hub.

Still another object of this invention is to provide a synchronizer of the type described which is economical in construction and effective in operation.

Other objects and features of this invention will be made apparent as the description progresses.

BRIEF DESCRIPTION OF THE DRAWINGS

In the accompanying drawings, in which one of various possible embodiments is illustrated.

FIG. 2 is an enlarged fragmentary view of FIG. 1 illustrating a clutch and synchronizer assembly of this invention; and FIG. 3 is a section taken along line 3—3 of FIG. 2, the view being rotated clockwise 120° and certain parts being removed for clarity.

Like parts are shown by corresponding parts throughout the several views of the drawings.

DESCRIPTION OF THE PREFERRED EMBODIMENT

Figure 1:
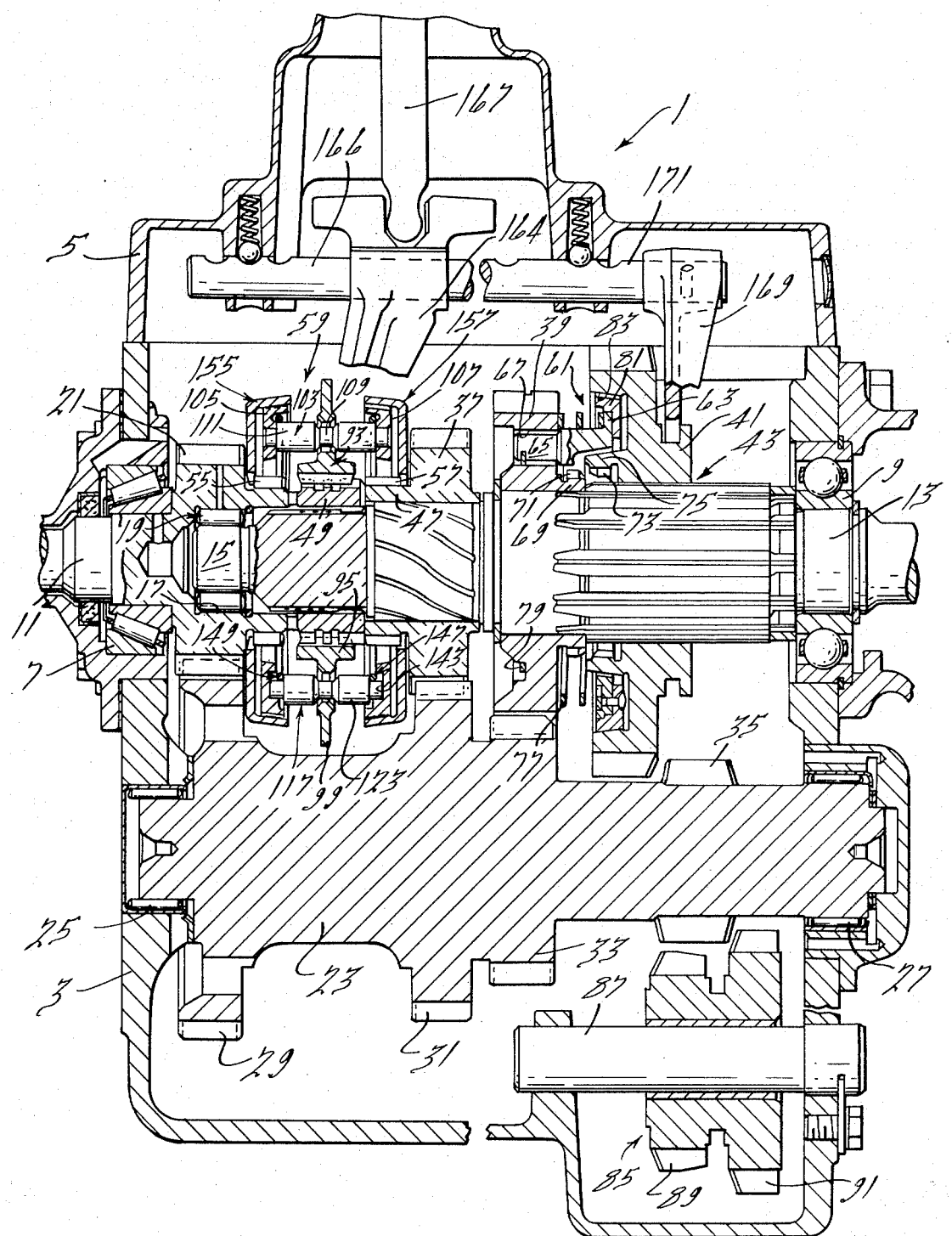
FIG. 1 is a vertical section view taken through a multiple gear ratio manual transmission in which a clutch and synchronizer assembly of the present invention is incorporated.

Referring now to the drawings, a four speed manually operated transmission is shown at 1. It includes a transmission housing 3 having a cover member 5 secured thereto. Coaxially mounted within case or housing 3 are bearing assemblies 7 and 9 which respectively serve to journal one end of a transmission input shaft 11 and a main or output shaft 13. The innermost or forward end 15 of output shaft 13 is piloted within a suitable bore 17 of input shaft by bearings 19. Input shaft 11 has a drive gear 21 on the rearward end thereof inside housing 3.

A countershaft cluster gear 23, suitably journalled in case 3 by bearings 25 and 27 has a plurality of gears 29, 31, 33 and 35 thereon. Gear 29 is in mesh with gear 21 on input shaft 11. Freely rotatable on output shaft 13 are gears 37 and 39. A gear 41 is splined at 43 to output shaft 13. Gears 37 and 39 are in constant mesh with gears 31 and 33, respectively.

Gears 21 and 37 have axially extending annular flanges 45 and 47, respectively extending toward one another. A clutch hub 49 is splined at 51 to output shaft 13. Hub 49 has clutch teeth or splines 53 on the periphery thereof, which are divided into three sections. The flanges 45 and 47 are also formed with clutch teeth 55 and 57, respectively.

Gears 37 and 21 are adapted to be clutched to output shaft 13 by a synchronizing and clutching apparatus 59 of the invention described in detail hereinafter. Gear 39 is adapted to be clutched to shaft 13 by a clutching assembly 61 which clutches gear 41 to gear 39. Clutching assembly 61 includes an annular clutch plate 63 having pins 65 extending therefrom into openings 67 in gear 39. Gear 39 has an annular flange 69 which has clutch teeth 71 adapted, upon movement of gear 41 towards gear 39, to mesh with internal clutch teeth 73 on an annular flange 75 of gear 41.

Spring 77 surrounding pins 65 bias plate 63 toward gear 41. A ring 79 extending around shaft 13 and connected to pins 65 prevents spring 77 from completely separating the plate 63 from gear 39. Plate 63 has a frusto-conical shaped friction member 81 connected thereto adapted to frictionally engage an internal surface 83 of gear 41. The operation of the clutch 61 will be described later in connection with the operation of the transmission.

A reverse idler cluster 85 is mounted on a shaft 87 and includes two gears 89 and 91. Movement of the cluster 85 to the left as viewed in FIG. 1 will cause gear 91 to mesh with gear 35 and gear 89 to mesh with gear 41, thus effecting a rotation of shaft 13 which is opposite the rotation of input shaft 11.

Synchronizer assembly 59 includes a central sliding clutch member 93 having an axially extending annular flange portion 95 formed internally with splines or teeth 97 in mesh with clutch teeth 53 on clutch hub 49. A radially extending flange portion 99 projects from axially extending portion 95.

Spaced around the radial portion 99 and extending through openings 101 therein are a plurality of blocking pins 103. The ends of pins 103 are secured, as by riveting, for example, into cone rings 105 and 107, thus forming a rigid structure or cage of the pins and rings. The pins 103 have a central portion 109 of a reduced diameter connected to enlarged diameter portions 111 by chamfers 113 and 115.

The assembly includes a plurality of pin energizers 117 floating in the clutch member 93. These pins are preferably formed of a solid metal, extend through openings 119 and have a central portion 121 of a reduced diameter joined with enlarged diameter portions 123 and 125 by chamfers 127 and 129 which correspond to chamfers 131 and 133 on opposite sides of radial flange 99 around opening 119. The ends 135 and 137 of pins 117 are of reduced diameter, less than portions 123 and 125, so that shoulders 139 and 141 are formed, and extend into recesses 143 and 145 in cones 105 and 107.

The length of ends 135 and 137 is greater than the depth of recesses 143 and 145. The ends are engaged between cones 105 and 107 and shoulders 139 and 141 by two wire-like springs 147 and 149. The springs have sections 148 engaging the energizing pins 117 which are spaced radially inwardly from adjacent sections 150 of the springs.

The rings 105 and 107 have frusto-conical surfaces 151 and 153 which are adapted to engage cone pocket members 155 and 157. Members 155 and 157 have ring engaging sections 159 and 161 and radially extending sections 163 and 165, respectively, splined to gears 21 and 37.

The clutch member 93 is adapted to be shifted by a fork 164 which is mounted on shift rail 166. A shift lever 167 is adapted to move fork 164. A shift fork 169 is mounted on a different shift rail 171 and is adapted to engage and move sliding gear 41.

Operation of the apparatus is as follows:

Assuming the transmission is in a neutral position, i.e., the position shown in FIG. 1, a first speed condition is attained by shifting gear 41 to the right. Since the vehicle is stationary, and neither shafts 11 or 13 are rotating, the teeth on gear 41 engage and mesh with the teeth on gear 35. When the shaft 11 is rotated, rotating countershaft 23, the output shaft 13 will be rotated.

The transmission is shifted from a first speed condition to a second speed condition by moving gear 41 to the left. Initially, gears 41 and 35 will disengage. Next, the surface 83 will frictionally engage the friction member 81. This member is rotating at a higher speed than shaft 13 since it is connected to gear 39 driven by gear 33. The surface 83 and member 81 slip until the speeds of gear 39 and 41 are synchronized, at which point further movement of gear 41 causes the clutch member 61 to move to the left and the clutch teeth 71 and 73 to engage one another, thus positively coupling gear 39 to output shaft 13.

The transmission is shifted from a second speed condition to a third speed condition by moving gear 41 back to its initial position. Clutch member 93 is then moved by fork 164, to the right as viewed in FIG. 1. The chamfer portions 131 immediately engage the chamfers 127 on pins 117. The distance between chamfers 113 and 115 on blocking pins 103 is greater than the distance between chamfers 127 and 129 on pins 117 so that the clutch member 93 is still spaced from chamfer 115.

Continued movement of clutch member 93 to the right causes the pins 117, after a small clearance movement, to engage and push cone ring 107 towards engagement with cone pocket member 157. It will be noted that springs 147 and 149 maintain the pins 117 in their most radially outward position.

The initial contact between the cone ring 107 and the cone pocket member 157 results in torque transferred from the member 157 to the cage formed by rings 105 and 107 and pins 103. This causes the cage to rotate relative to the clutch member 93 until the reduced central portions 109 engage the sides of holes 101. The pins 117 are driven radially inwardly as the chamfers 131 and 127 slide on one another. The springs 147 and 149 are forced inwardly by the movement. As the clutch member 93 is moved to the right and the force between the ring engaging section 161 and the cone pocket member 157 increases, the chamfers 115 on blocking pins 103 are engaged by the clutch member 93. This becomes the fully blocked condition since the cone torque exceeds the torque created by the axial force on chamfers 115. This condition remains until the speeds of the gear 37 and clutch member 93, hub 49 and output shaft 13 are synchronized. When synchronization is accomplished the cage is rotated backwards relative to the clutch member 93. The clutch member 93 may then be moved farther to the right to engage clutch teeth 97 with teeth 57.

The transmission is shifted from third to a fourth speed condition by moving clutch member 93 to the left as viewed in FIG. 1. The gear 21 is clutched and then connected to output shaft 13 in a manner similar to the connection of gear 37 to the shaft 13. In view of this similarity, a detailed description thereof is believed unnecessary.

It will be noted that there is an increase in the energizing forces as the speed of rotation increases. Normally, increased speeds are accompanied by increased vibrational forces which tend to unblock the blocking pins before synchronization is complete. This results in clashing of the gears. However, since the pins 117 have considerable mass, the centrifugal forces on the pins augment the forces of the springs on the pins. Thus, greater lateral thrust forces must be applied to the pins 117 by the clutch member 93 before such pins are moved radially inwardly. These increased lateral thrusting forces cause the rings 105 and 107 to functionally engage the cone pockets faster and cause synchronization sooner.

The transmission is placed in a reverse drive condition by sliding gear cluster 85 to the left to place gear 91 in mesh with gear 35 and gear 89 in mesh with gear 41.

In view of the foregoing it will be seen that the several objects and other advantages are achieved.

Although only one embodiment of the invention has been disclosed and described, it is apparent that other embodiments and modifications of the invention are possible.

I claim:

1. In a transmission having an output shaft and a gear rotatably mounted on said shaft, the gear having clutch teeth thereon, a clutch and synchronizer assembly for selectively coupling the gear to the output shaft, comprising a first friction member connected to said gear and adapted to rotate therewith, a clutch hub connected to said shaft for rotation therewith, a central clutch member connected to said hub for sliding movement relative thereto, and rotational movement conjointly therewith, said clutch member having teeth thereon adapted to engage the clutch teeth on said gear upon movement in one direction, said clutch member having a plurality of openings therein extending generally parallel to said output shaft, two axially movable second friction members on opposite sides of said clutch member, one of said axially movable second friction members being adapted to engage said first friction member, blocker pins extending through some of said openings and connecting said second friction members together, said blocker pins having blocking means thereon adapted to limit movement of said clutch member toward said gear when said clutch member and said gear are rotating at different speeds, energizing pins extending through others of said openings, the ends of said energizing pins extending into recesses in said second friction members, elongated spring means biasing said energizing pins in an outward direction, said spring means being located on both sides of said clutch member, said spring member yielding to permit inward movement of said energizing pins upon the application of a predetermined force thereto by said clutch member as the latter is moved toward said gear, said second friction members and said pins moving rotatably relative to said clutch member when said one of said second friction members engages said first friction member, said blocker pins permitting movement of said clutch member toward said gear when said gear and clutch member are rotating synchronously to cause engagement of said teeth on said clutch member with said clutch teeth on said gear.

2. An assembly as set forth in claim 1 wherein said spring means comprises two elongated springs, each of said springs engaging the ends of three of said energizing pins.

3. An assembly as set forth in claim 2 wherein the end portions of each spring engage the ends of two of said energizing pins, the ends of the third energizing pin being engaged by the central portion of each spring.

4. An assembly as set forth in claim 1 wherein said spring means comprises two elongated springs, each spring passing radially outwardly of the ends of at least one of said blocker pins and radially inwardly of the ends of said energizing pins.

5. An assembly as set forth in claim 1 wherein the ends of each of said energizing pins are smaller than the portions of said pins immediately adjacent and inwardly from said ends, said spring means comprising two elongated springs, said springs passing radially inwardly of said energizing pins and between said portions thereof immediately adjacent the ends thereof and said second friction members.

6. An assembly as set forth in claim 1 wherein each of said energizing pins includes a central portion normally located in said others of said openings, intermediate side portions larger than said central portion on opposite sides thereof, chamfer portions joining said central portion and said intermediate side portions, said ends being smaller than said intermediate side portions, said spring means engaging said energizing pins between said intermediate side portions and said second friction means.

7. An assembly as set forth in claim 6 wherein said spring means comprises two elongated springs, each of said springs engaging the ends of three of said energizing pins.

8. An assembly as set forth in claim 7 wherein the end portions of each spring engage the ends of two of said energizing pins, the ends of the third energizing pin being engaged by the central portion of each spring.

9. An assembly as set forth in claim 6 wherein said spring means comprises two elongated springs, each spring passing radially outwardly of the ends of at least one of said blocker pins and radially inwardly of the ends of said energizing pins.

10. An assembly as set forth in claim 5 wherein said spring means includes two elongated wire-shaped springs, said springs having sections engaging said energizing pins, said sections of said springs being spaced radially inward from the adjacent sections of said springs.

* * * * *

UNITED STATES PATENT OFFICE
CERTIFICATE OF CORRECTION

Patent No. 3,692,163      Dated September 19, 1972

Inventor(s) THURMAN O. RUETTINGER

It is certified that error appears in the above-identified patent and that said Letters Patent are hereby corrected as shown below:

On the cover sheet insert -- [73] Assignee

Chrysler Corporation, Highland Park, Michigan --.

Signed and sealed this 1st day of May 1973.

(SEAL)
Attest:

EDWARD M. FLETCHER, JR.           ROBERT GOTTSCHALK
Attesting Officer                  Commissioner of Patents